Patented Nov. 30, 1937

2,100,442

UNITED STATES PATENT OFFICE 2,100,442

REFLECTING SYSTEM FOR OBJECTIVES OF REPRODUCTION CAMERAS

Carl Herrmann, Jena, Germany, assignor to the firm of Carl Zeiss, Jena, Germany

Application November 27, 1936, Serial No. 113,070
In Germany April 17, 1936

2 Claims. (Cl. 88—74)

Some projection apparatus, especially projection apparatus used in photographic reproduction, have a reflecting system deviating the pencil of imaging rays at right angles. In such apparatus, the reflecting system effects a single inversion of the image, and the image plane is at right angles, and not parallel, to the object plane. If, in special cases, the image is not desired to be inverted, the reflecting system is removed from the ray path, and the object is projected on an image plane parallel to the object plane. To avoid a change of the image planes during projection, it has been suggested to make the plane reflector which effects the image inversion interchangeable with a reflecting prism having a tectiform reflecting surface, a system of this kind effecting a double image inversion and the image produced being, accordingly, the same as an image projected without a reflecting system.

The method mentioned last is not very advantageous in that the two image planes, though parallel to each other, do not coincide. Changing from the one kind of projection to the other therefore entails the necessity of another focusing adjustment. Obviously, the problem cannot be solved with projection apparatus having an automatic focusing device, i. e. with projection apparatus in which the distance of the projection objective from the object plane and that of this objective from the image plane have a ratio changeable according to a definite law.

The invention overcomes this disadvantage by providing a reflecting system for projection purposes, especially for use in reproduction cameras, that consists of a roof-edge reflector, composed of two plane mirrors, and a single plane reflector, which two reflectors can be placed alternatively in the path of the pencil of imaging rays, this change effecting an inversion of the image without the position of the image plane relative to the projection objective having to be altered. It is advisable to simplify this change by attaching both the single plane reflector and the roof-edge reflector to the projection apparatus by means of a changing device.

Figure 1:
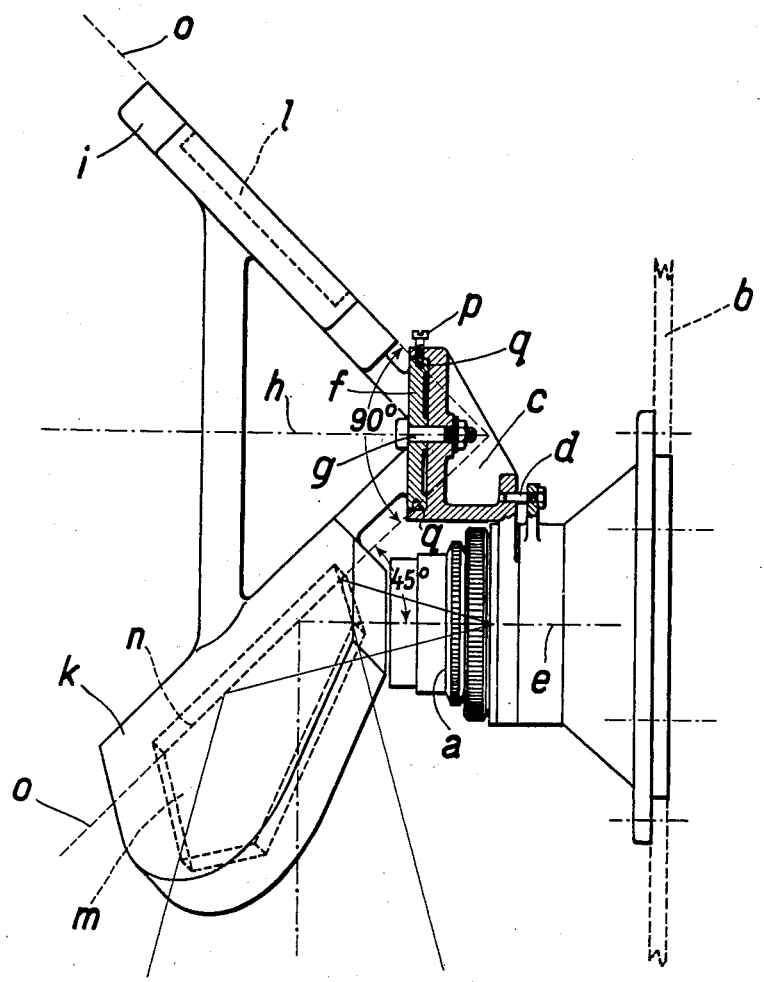
Figure 2:
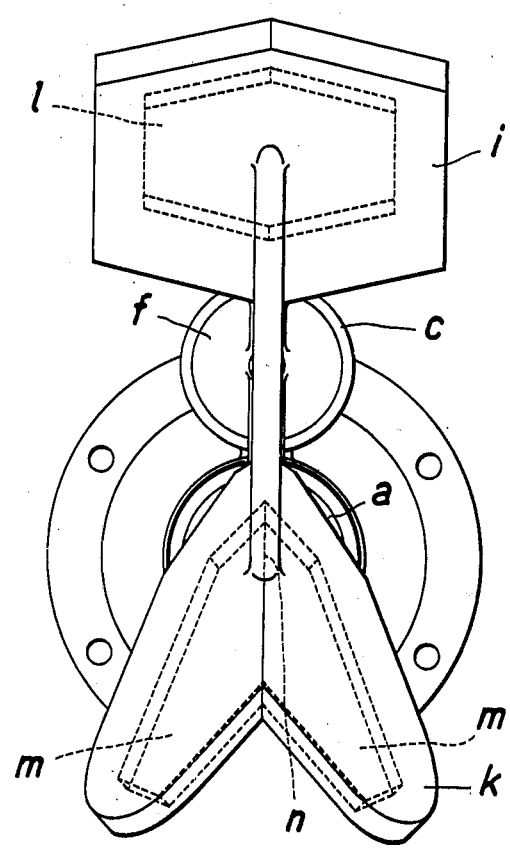

In the accompanying drawings, Figure 1 shows a part-sectional elevation and Figure 2 is a front view of a constructional example of the invention.

A carrier $c$ is fixed to the mount $a$ of the objective of a reproduction camera $b$ and prevented by a pin $d$ from rotating about the optical axis $e$ of the objective. On the carrier $c$, a disc $f$ is rotatable about a bolt $g$, the axis $h$ of which is parallel to the optical axis $e$ of the objective. To the disc $f$ are attached two holders $k$ and $i$ which respectively contain a roof-edge reflector, consisting of two plane mirrors, $m$, and a plane reflector $l$ at right angles to each other. The edge $n$, in which the two mirrors $m$ touch each other, lies on a conical surface $o$ whose axis coincides with the axis $h$ of the bolt $g$. The reflecting surface of the plane, reflector $l$, which is at right angles to the edge $n$, touches a generatrix of the cone $o$. That generatrix of the cone $o$ which lies in the plane determined by the axes $e$ and $h$ intersects the axis $e$ at an angle of 45°. Into the carrier $c$ is screwed a screw $p$ which can engage alternatively in two notches $q$ in the disc $f$. When the screw $p$ engages in the one of the notches $q$, the optical axis $e$ of the objective intersects the edge $n$, and when the screw $p$ engages in the other of the notches $q$, the optical axis $e$ intersects that generatrix of the cone $o$ touched by the reflecting surface of the reflector $l$.

When using the reflecting system, the screw $p$ is made to extend into one of the notches $q$, for instance into the notch it engages in the drawings, in which the edge $n$ intersects the axis $e$ of the objectve. The roof-edge reflector consisting of the mirrors $m$ lies, accordingly, in the path of the imaging rays. The projected image is erect and laterally correct, because the double inversion due to the roof-edge reflector neutralizes the complete image inversion effected by the projection objective. If, however, only a single image inversion is desired in the projection, the screw $p$ is undone and the disc $f$ with the holders $i$ and $k$ is rotated so much that the screw $p$ can engage in the other notch $q$. The plane reflector $l$ now lies in the path of the imaging rays, and the complete image inversion effected by the projection objective is neutralized by reflection on the reflector $l$ only partly, the consequence being a projected image which is laterally reversed.

I claim:

1. A reflecting system, comprising a carrier, means for attaching this carrier to the objective of a reproduction camera, a disc mounted on the said carrier and rotatable about an axis, two holders attached to the said disc, a plane reflector disposed on the one of the said holders, and a roof-edge reflector consisting of two plane mirrors inclined to each other at an angle of 90° and being disposed on the other of the said holders, the edge in which the two plane mirrors of the roof-edge reflector touch each other lying on a conical surface whose axis coincides with the axis of rotation of the said disc, the said plane reflector touching a generatrix of the said conical surface, the optical axis of the said objective intersecting one of the generatrices of the said conical surfaces at an angle of 45°, this optical axis intersecting the said plane reflector when this plane reflector assumes operative position, in which the said one generatrix lies on the said plane reflector, and intersecting the edge in which the two mirrors of the said roof-edge reflector touch each other when this roof-edge reflector assumes operative position, in which the said one generatrix coincides with the said edge, the said reflectors, when in operative position, facing the said objective.

2. In a reflecting system according to claim 1, means for holding the said disc in either of two positions, these positions corresponding to the said operative positions of the said reflectors.

CARL HERRMANN.